Oct. 12, 1937. A. S. GRETH 2,095,665
PARALLELING AND SURVEYING MACHINE
Filed June 21, 1935 3 Sheets-Sheet 2

August S. Greth INVENTOR

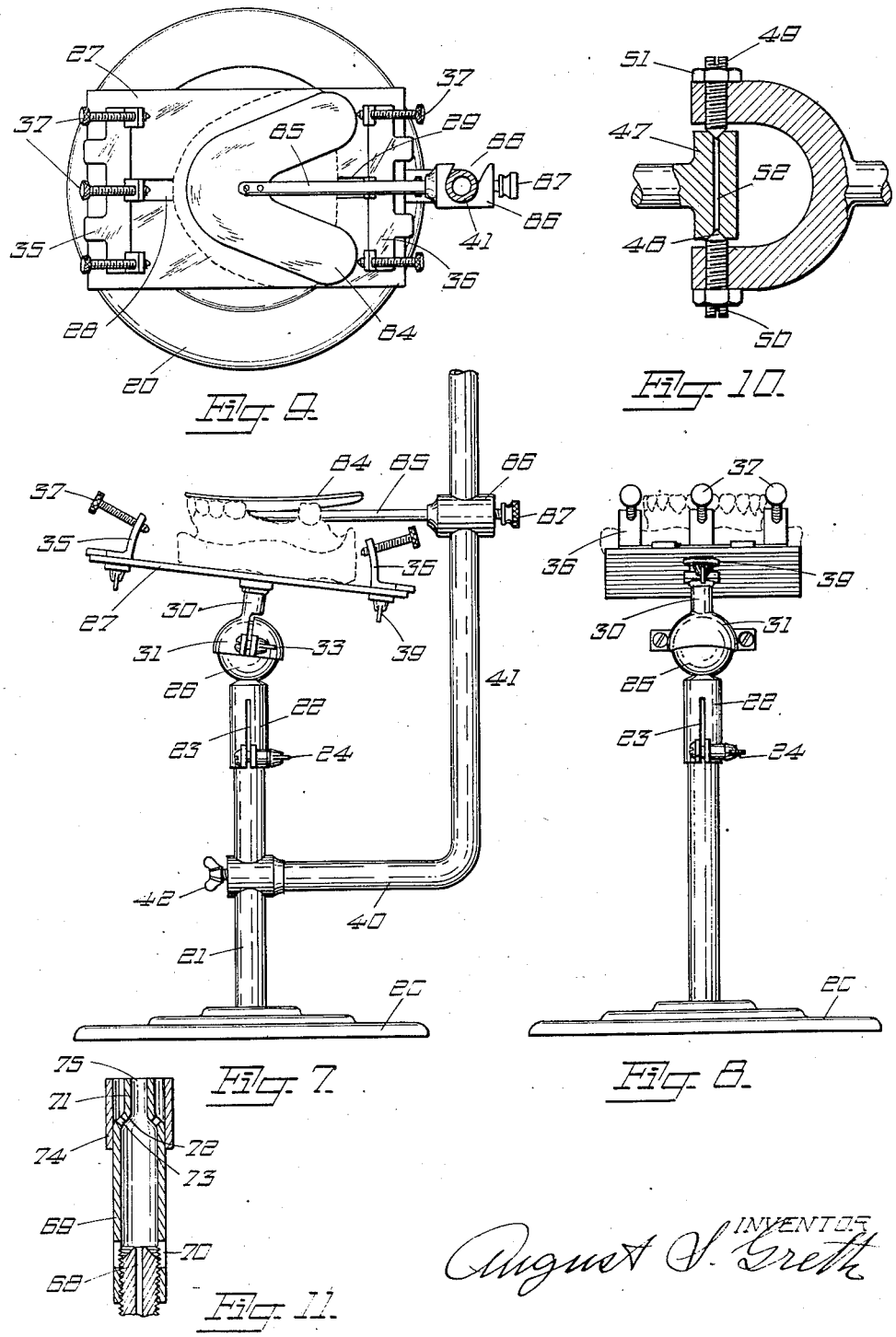

Patented Oct. 12, 1937

2,095,665

UNITED STATES PATENT OFFICE 2,095,665

PARALLELING AND SURVEYING MACHINE

August S. Greth, Santa Cruz, Calif.

Application June 21, 1935, Serial No. 27,789

3 Claims. (Cl. 32—67)

This invention, a paralleling and surveying machine for dentures, combines many features of advantage over devices now in use for similar purposes, and provides in one machine, a paralleling device, surveying device, waxing means, occlusal template and repair chuck, the occlusal template providing for quick arbitrary occlusal set-up, which is maintained throughout all operations on the dentures, permitting removal of the chuck or the denture or model from the chuck without disturbing the set-up at replacement.

The model may be chucked up and matched to the template to locate the surface of the teeth in the occlusal plane and the template removed, after which all other operations, including paralleling, surveying, waxing, building up the bridge, and other operations may be carried out, removing the chuck or model at will, and replacing as required without disturbing the occlusal alignment.

The objects of the invention are as follows;

First; To provide a machine on which all operations on models or dentures may be carried out, including paralleling, surveying, waxing, trimming, building up removable bridges, and repair work.

Second; To provide a machine of the class described with a universally adjustable, quick-acting chuck, which, after primary adjustment, is removable and replaceable without disturbing the plane of a model or denture relative to the occlusal plane.

Third; To provide a universally adjustable scriber or surveying point.

Fourth; To provide a machine of the class outlined with adjustable pivots to insure accuracy in paralleling, surveying and waxing.

Fifth; To provide a Bunsen burner which is universally adjustable relative to the chuck, for convenience in waxing and trimming and similar operations.

Sixth; To make the paralleling, surveying and burner parts of the machine quickly removable for changing the machine into a repair chuck.

Other objects and advantages of the invention will become apparent as the following description is read on the drawings forming a part of this specification, and in which similar reference characters are used to designate similar parts throughout the several views, of which;

Fig. 6 is a plan view of Fig. 4.

Fig. 7 is a fragmentary side elevation of the device showing the model adjusted to the occlusal template.

Fig. 8 is a front view of Fig. 7.

Fig. 9 is a plan view of Fig. 7.

Fig. 10 is an enlarged section through one of the pivotal connections of the sweep arm.

Fig. 11 is a sectional elevation through the burner.

Figure 1:
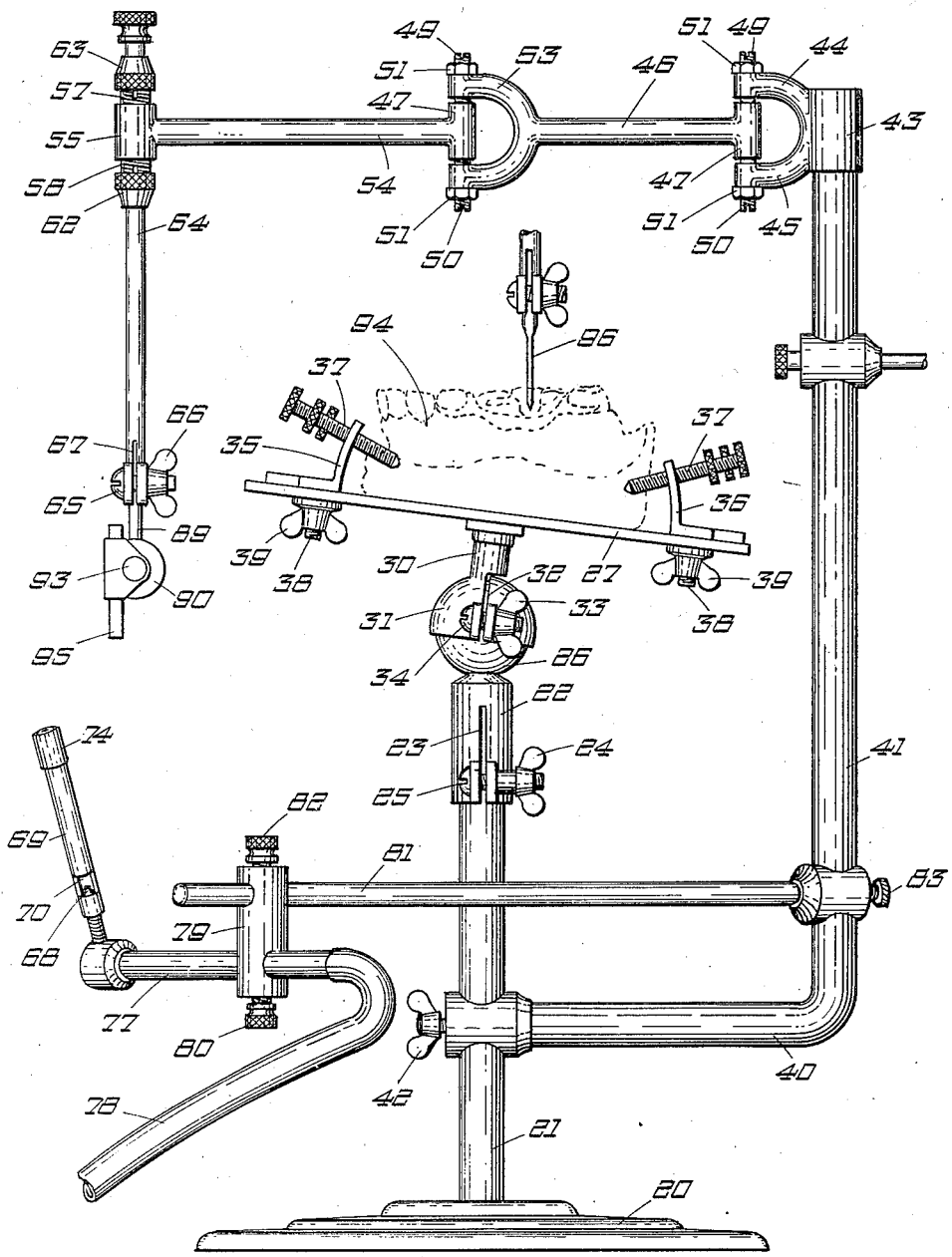
Fig. 1 is a front elevation of the invention showing the complete machine.
Figure 2:
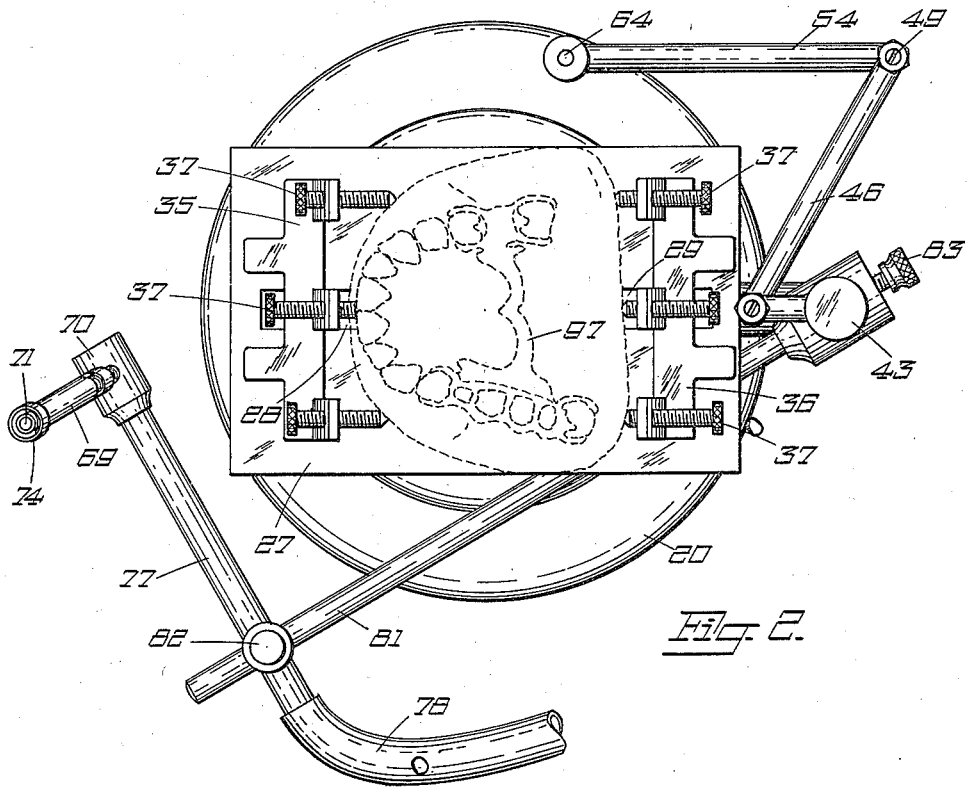
Fig. 2 is a plan view of Fig. 1.
Figure 3:
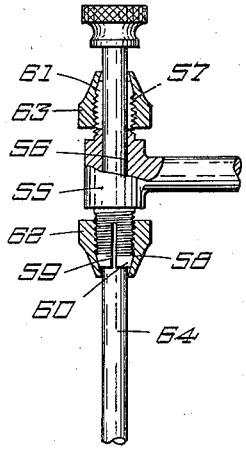
Fig. 3 is a fragmentary view showing the paralleling, scribing and waxing head partly in section.

The invention consists of a base 20 having a standard 21 mounted therein perpendicular to the bottom surface of the base, and being preferably cylindrical in form.

Rotatably adjustable and clampingly secured on the upper end of the perpendicular standard is a chuck head, consisting of a sleeve 22, split at 23, and clamped in adjusted position by means of a thumb nut 24 cooperating with a clamp screw 25, the upper end of the chuck head terminating in a ball joint 26.

Mounted on the ball joint 26 for universal adjustment is a chuck consisting of a face plate 27, which is provided with longitudinally aligned slots 28 and 29, and a pedestal 30 is fixedly secured intermediate the length of the face plate and terminates at its lower end in a socket 31, which is split as shown at 32, and secured in any adjusted position by means of thumb nuts 33 cooperating with clamp screws 34.

Mounted on the top of the face plate for instant removal are the jaws, which consist of the respective jaw members 35 and 36, each of which is provided with a plurality of spaced-apart set screws 37, which are inclined toward the center of the face plate, a screw 38 being fixed in each jaw and passing through the slots 28 and 29, the thumb nuts 39 cooperating with the under-surface of the face plate to clamp the jaws in adjusted position.

The parts so far described constitute the repair chuck, and may be used alone for all kinds of denture repair work.

The paralleling and surveying attachment consists of an arm 40, which is rotatably and vertically adjustable on the standard 21, and being formed at right angles to form a second standard 41, which is absolutely parallel with the standard 21 in any adjusted position, and is clamped in adjusted position by means of the thumb screw 55

42, the standard 41 terminating at its upper end in a forked pivot-head 43 which is fixedly secured thereto.

Pivotally secured between the arms 44 and 45 of pivot-head 43 is a first traversing arm 46, which has formed at one end the cooperating pivot heel 47, which is provided with conical seats 48 for cooperation with the cone points of the set screws 49 and 50, which are locked in adjusted position by means of nuts 51, and an oil chamber 52 provides ample lubrication for the pivot joints, this reservoir being shown as formed axially through the pivot heel.

The first traversing arm 46 terminates at its other end in a yoke 53, between the arms of which the second traversing arm 54 is pivotally secured by the same method as described for 44—45—47, and terminates at its outer end in a plunger head 55 having a bore 56, the axis of which is exactly parallel with the standard 21. The pivotal joints 47—49—50 are also in parallel alignment with the standards 21 and 41.

The plunger head has concentric threaded extensions 57 and 58 which are split as shown at 59 and terminate in conical ends 60 and 61, the draw nuts 62 and 63 acting to contract the extensions on the plunger or shaft 64.

These chucks may be adjusted at will to permit the plunger to slide freely or frictionally, or they may be adjusted to immovably clamp the plunger in any adjusted position, always maintaining the plunger 64 in parallelism with the standards 21 and 41.

The plunger 64 terminates at its upper end in a combined finger hold and stop, and at its other end in a clamp chuck consisting of an axial bore slidably receiving the various paralleling, surveying, waxing and trimming instrument shafts, and which are clamped in adjusted position through the medium of the clamp screw 65 and nut 66, the shaft being split as at 67.

The Bunsen burner consists of a duplex burner having a single jet 68 with mixing tube 69 adjustable thereon and provided with air passages 70, the upper end of the tube being restricted as shown at 71 forming an annular shoulder 72 with gas passages 73 formed through the shoulder, and a sleeve 74 pressed on the large portion of the tube forming two combustion zones, a central zone 75 and an encompassing zone 76, forming thereby an unusually hot flame and assuring complete combustion. The air passages 70 are adjusted by adjusting the tube on the jet, and part of the combustible gas passes through the passages 73.

This burner is mounted at one end of a gas supply tube 77, to the other end of which a gas supply hose 78 is attached, the tube 77 being axially and rotatably adjustable in a head 79 and clamped in adjusted position by means of the thumb screw 80.

The head 79 is horizontally and rotatably adjustable on an arm 81 and fixed in adjusted position by means of the thumb screw 82. The arm 81 is both rotatably and vertically adjustable on the standard 41 and clamped in adjusted position by means of the clamp screw 83.

The occlusal template consists of a reversible template 84, one face of which is formed to the normal shape of the upper teeth and the opposite surface of which is formed to the normal surface of the lower teeth, and is fixed to the occlusal arm 85, which in turn terminates in a clamp head 86 which is instantly removable and reversible, and adjustable both rotatably and vertically and secured in occlusal alignment by means of the clamp screw 87, the loosening of which permits instant removal or reversal for upper or lower plates, the diagonal slot assuring true occlusal alignment, since the cooperative surface is a true bore and cooperates with the standard 41.

The surveying head consists of a shaft 89 fixedly secured at one end in a head 90 which is in the form of a disc, the other end of the shaft being received by the chuck 65—66—67. A pencil, scriber or trimmer holder 91 has a pencil or spatula receiving slot 92 formed therein and is adjustably secured to the head by means of a clamp nut 93, which coincidentally clamps the lead, spatula or other instrument in adjusted position. This surveying head permits angular adjustment of the instrument or scriber through a complete circle about a horizontal plane, which is of great advantage in surveying other features than the teeth.

The operation of the invention is as follows.

The master model 94 is first chucked up by laying it on the face plate 27, releasing the nuts 39, sliding the jaws 35 and 36 fairly close to the model, tightening the nuts 39, adjusting the set screws 37 to securely clamp the model in position, after which, when desired, the model may be removed and replaced by merely loosening one of the nuts 39, sliding the one jaw back, which releases the model, and for replacing the model it is only necessary to place it back against the set screws of the clamped jaw, move the other jaw to clamp, and tighten the nut.

The next operation is to obtain a quick arbitrary occlusal plane. The nut 33 is first loosened to permit universal adjustment of the chuck, the occlusal template is engaged on the standard 41 as shown at 84—85—86, Fig. 7, and adjusted down to the face of the model and the chuck adjusted universally and the template vertically until the template and the face of the model coincide, after which the nut 33 is tightened. The model is then in occlusal alignment. It will be noted that the template is reversible on the standard for upper and lower plates.

Figure 5:
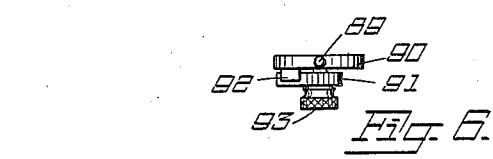
Fig. 5 is a side elevation of Fig. 4.
Figure 5:
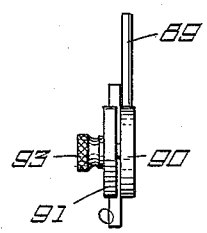
Figure 4:
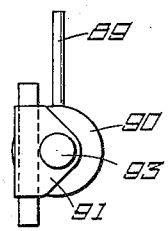
Fig. 4 is a front elevation of the universally adjustable scriber.

After this second operation is completed, the parallel scriber, Figs. 4, 5 and 6, shown in position on Fig. 1 is next used for paralleling, the standard 41 being adjusted on standard 21 to permit operation of the point 95 all about the teeth, the plunger 64 being adjusted for free sliding movement in the head by suitable adjustment of the chucks 62 and 63.

Since the paralleling and surveying arm 46—54 is hinged or pivoted at two points, the scriber may be moved to contact the peripheries of the various teeth of the model to locate all of the high points, and as the plunger is also rotatable in the head 55, the exact external contour of each tooth is readily followed, the lead 95 definitely marking the laterally projecting surfaces and clearly disclosing undercuts.

The next operation is surveying. The parallel scriber is angularly adjusted about its pivot 93 to a suitable angle to follow and scribe the angular portions of the gums and cavities while the plunger may be set for any height by tightening the chucks 62 and 63, thus the elevational contours may be scribed.

The next operation is waxing. The parallel scriber is removed and replaced by the spatula 96, the chucks 62 and 63 being eased up, burner 69—74 is adjusted to the most convenient position and lighted, the wax melted and roughly applied to the model, after which the spatula is heated over the burner and passed about the teeth of the model to trim the wax and fill in all undercuts.

The next operation is making the working model. One nut 39 is loosened, the master model removed and the working model is cast therefrom of artificial stone, such as "Castone" in "Duplicon" or gelatine, with all undercuts obliterated.

The working model is then clamped up in the chuck by placing in the same position as that occupied by the master model, and the loosened jaw moved into clamping position and the nut 39 tightened, after which the scriber is again placed in the plunger 64 and the removable bridge 97 is laid off on the working model, after which the bridge and necessary gates and vents are built up in wax on the model, the scriber removed and replaced by the spatula, the burner again lighted, and the bridge trimmed by means of the heated spatula.

The working model is then removed from the machine and invested, roasted at about 1600° C., the wax being roasted out and forming the mold for the bridge and the necessary gates and vents.

From the above description it will be noted that all operations starting with the completion of the master model and ending with the completion of the working model with built up wax bridge are carried out in this machine with a single adjustment.

It will be understood that variations in construction and arrangement of parts, and in the method employed, which variations are consistent with the appended claims, may be resorted to, without detracting from the spirit or scope of the invention or sacrificing any of the advantages thereof.

I claim:

1. In a denture device, a base, a chuck standard fixed in said base, and a traversing-arm standard having an integral horizontal arm rotatably and vertically adjustable on said chuck standard, and means for securing said traversing-arm standard in adjusted position on said chuck standard, at will.

2. In a denture device, a base, a chuck standard fixed in said base, a traversing-arm standard having an integral horizontal arm rotatably and vertically adjustable on said chuck standard, whereby said traversing arm standard may be adjusted vertically and radially on said chuck standard, at will, means for securing said horizontal arm in adjusted position, and a traversing arm pivotally secured to the upper end of said traversing-arm standard and pivoted intermediate its length, and a scriber plunger frictionally adjustable in said traversing arm, and a scriber radially adjustable on an axis at right angles to said plunger and mounted thereon.

3. In a denture device, a base, a chuck standard and a chuck removably and rotatably mounted at the top of said chuck standard, a traversing arm standard terminating at its lower end in a right angle extension arm supporting said standard and having its terminal end radially and vertically adjustably secured on said chuck standard, a traversing-arm head fixed at the upper end of said traversing-arm standard, an intermediately pivoted traversing arm having one end pivotally connected to said head and terminating at its other end in a plunger head, a plunger slidable and rotatable in said plunger head, and means adjustable on said plunger head for varying at will the frictional resistance to sliding and rotative movement of said plunger in said plunger head, and a scriber holder radially adjustable on an axis transverse to the axis of said plunger and removably attached thereto, and means for securing a scriber in said holder in radially adjusted position.

AUGUST S. GRETH.